May 26, 1931.  F. SPANIER  1,806,718

SECTIONAL WEDGE

Filed June 28, 1928

INVENTOR

Patented May 26, 1931

1,806,718

UNITED STATES PATENT OFFICE

FRITZ SPANIER, OF KARLSRUHE, GERMANY

SECTIONAL WEDGE

Application filed June 28, 1928, Serial No. 288,969, and in Germany August 30, 1927.

In dental practice it frequently occurs that a tooth cannot be drawn by means of forceps, but must be raised by means of an elevator or the like. In this case, if immediately adjacent the tooth to be drawn there is a second tooth against which the elevator is supported, and adjacent this tooth there is a gap, the adjacent tooth has great stress imposed upon it by the pressure of the elevator, and is often loosened. My invention relates to a simple device for avoiding this.

Figure 1:
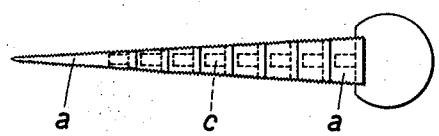
Figure 2:
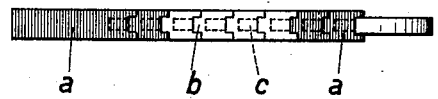
Figure 3:
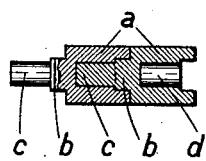
Figure 4:
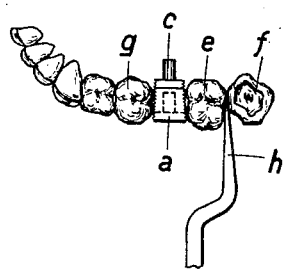
Figure 5:
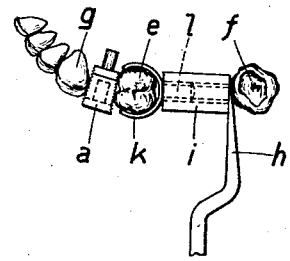

In the accompanying drawings which show the preferred embodiment of my invention, Fig. 1 is a plan view of the device, Fig. 2 is a side view thereof, Fig. 3 is an enlarged longitudinal sectional view of a part thereof, and Figs. 4 and 5 show rows of teeth with a member thereof mounted in a gap in the row.

The device consists of a sectional wedge $a$ of metal, ceramic or other suitable material, the thickness of which increases continuously from the narrowest to the greatest width of tooth. In the example illustrated the sections of the wedge $a$ are pieced together as shown in Figs. 1 to 3 to form a rod, each section fitting by a prismatical projection $b$ into a corresponding recess and by an axially projecting cylindrical pin $c$ into a corresponding bore $d$ in the next narrower section.

After the removal of wedge sections that may prove too narrow or too wide according to the circumstances of the case, the proper section of the wedge $a$ is tightly inserted from without into the gap between the tooth $e$, Figs. 4 and 5, that is next to the tooth $f$ to be drawn, and the next tooth $g$, or if there is no gap between the teeth $e$ and $g$ but a narrow gap between the teeth $e$ and $f$, it is tightly inserted into this gap, so that in raising the tooth $f$ by means of an elevator $h$ the section of the wedge $a$ serves as a support either for the tooth $e$ against which the elevator $h$ is supported or for the latter itself.

In cases where there is a narrow gap between the teeth $e$ and $g$ and a wider gap between the teeth $e$ and $f$, as shown in Fig. 5, in addition to the proper section of the wedge $a$ to be inserted into the gap between teeth $e$ and $g$, there is used a prismatical piece $i$ of metal, ceramic or other suitable material carrying at one end an elastic cramp $k$ which is inserted into the gap between the teeth $e$ and $f$ in such manner that the cramp $k$ embraces the tooth $e$ and the piece $i$ serves as a support for the elevator $h$. The cramp $k$ is applied to the piece $i$ by means of a screw $l$ fixed to the cramp $k$ and fitting into a corresponding axial bore in the piece $i$, so that the cramp may be adjusted on the piece according to the width of the gap between the teeth $e$ and $f$.

The sectional wedge $a$ is roughened on both side faces to provide sufficient grip on the teeth. The wedge-sections may be preserved separated one from another in a support provided with suitable recesses and they may be withdrawn singly therefrom as they are required.

What I claim as my invention and desire to secure by Letters Patent is:

1. A device for drawing teeth by means of an elevator or the like, consisting of a sectional wedge, the thickness of which increases continuously from the narrowest to the greatest width of tooth, the sections of said wedge being adapted to be separated so that after the assembled wedge is inserted with the section of corresponding width into a gap between teeth the sections not needed may be removed.

2. A device for drawing teeth by means of an elevator or the like, consisting of a sectional wedge, the thickness of which increases continuously from the narrowest to the greatest width of tooth, each of the sections of said wedge fitting by a projection into a corresponding recess in the next narrower or wider section, and said sections being adapted to be separated so that after the assembled wedge is inserted with the section of corresponding width into a gap between teeth the sections not needed may be removed.

In testimony whereof I affix my signature.

DR. MED. FRITZ SPANIER.